MECHANISM FOR RECORDING TELEPHONE NUMBERS

Filed Sept. 10, 1965

INVENTOR.
ANTHONY M. ERA SR.
BY
[signature], Agent

United States Patent Office 3,336,688
Patented Aug. 22, 1967

3,336,688
MECHANISM FOR RECORDING TELEPHONE NUMBERS

Anthony M. Era, Sr., 2583 Crown Point Ave., Omaha, Nebr. 68111

Filed Sept. 10, 1965, Ser. No. 486,299
3 Claims. (Cl. 40—65)

ABSTRACT OF THE DISCLOSURE

This invention relates to a mechanism for recording telephone numbers without the use of a pen or pencil. The recording mechanism includes a group of of numbers covered by slidable windows which can uncover certain of the numbers within the group to serve as a temporary record of the telephone number to be dialed on a telephone.

This invention relates to devices for recording telephone numbers, and more particularly it is an object of this invention to provide a device for this purpose which is simple and efficient in operation.

Still another object is to provide a device for recording telephone numbers which is provided with a number-bearing means with the numbers thereon arranged in an order particularly useful for a swift recording of a desired number thereon.

A further object is to provide a number-bearing device on which letters are arranged in order for the convenient indication of the letters of a recorded telephone number.

A further object is to provide a recording device, the numerals of which are indicated by movable slides which can be quickly drawn into indicating position by the use of the finger-tip of the operator without the use of any additional instrument thereby eliminating the difficulty that so often such an additional instrument has been lost or become unavailable in the way that pencils and pens so often become unavailable in the area of a telephone.

Still another object of the invention is to provide a simple and inexpensive way in which persons can record numbers with an accuracy greater than can be attained in the hurried use of a pencil, especially by persons who are not in the habit of using pencils or pens continually in their other activities.

Still another object is to provide a number indicating device provided with means for clearing an indicated number therefrom whereby the device can be quickly re-used for recording another number.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
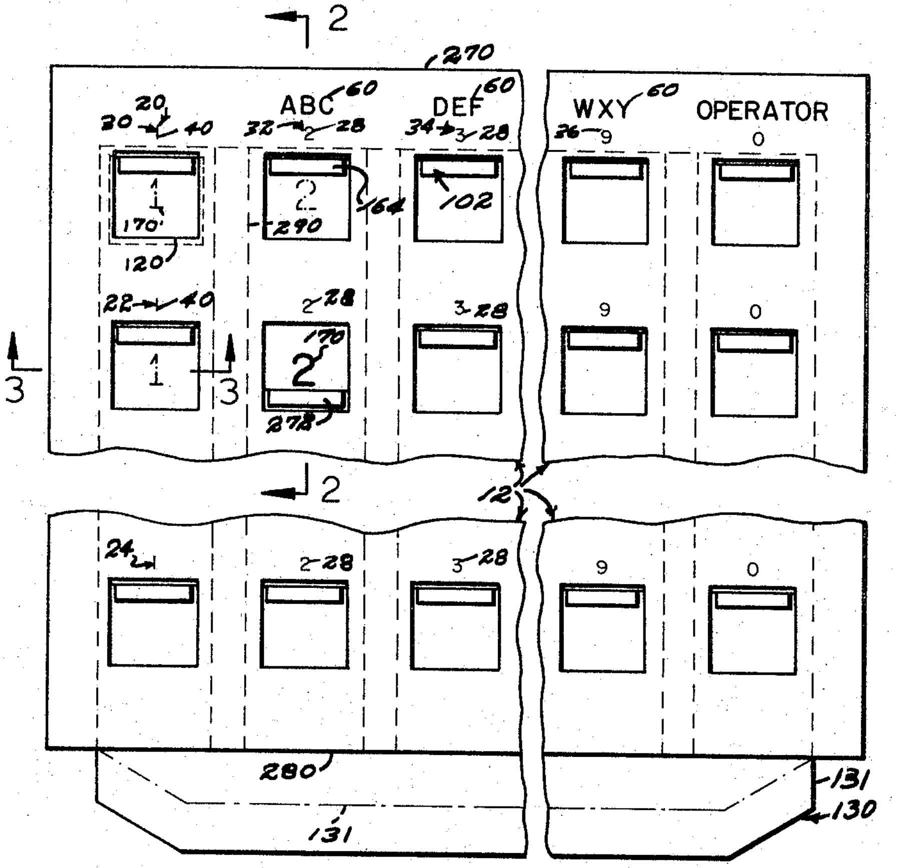
FIGURE 1 is a top plan view of the number indicating device of this invention with portions thereof broken away for convenience of illustration and to show the remaining portions in larger scale for ease of viewing.

The number indicating device of this invention is generally indicated at 10 in FIGURE 1 and has a number-bearing means indicated at 12 having thereon a plurality of first substantially straight rows of numbers as indicated at 20, 22, and 24, the said first rows of numbers preferably extending from right to left and being disposed in parallelism with each other and spaced apart with respect to each other equidistantly and said first rows being disposed alongside each other.

The numbers in each of said first rows being in sequence with each other, beginning with the numeral 1 and ending with the numeral 9.

The number-bearing means further has thereon second substantially straight rows of numerals indicated at 30, 32, 34, and 36, each extending at a right angle to a respective one of said first rows of numbers, such as the first row of numbers indicated at 20.

Each number, as illustrated by the numerals 40 of each of the first rows of numbers 20 and 22, for example, also each forming one of the numbers of one of the second rows 30, 32, 34, and 36. The numbers in each one of the second rows 30, 32, 34, and 36 is identical to other numbers in the respective second row, whereby all numbers in a vertically extending second row are identical, each being all 1's or each being all 2's, etc.

It will be seen that certain of the numbers in said first rows 20, 22, 24 form a group extending from 1 to 9 and that the first rows 20, 22, and 24 also have zero numerals therein forming also an end one of said second rows, the numerals in sequence from 2 to 9 each having three letters disposed in alignment therewith and associated therewith, the three letters above the row of 2's being the first three letters of the alphabet, each three letters, as described, forming what can be called a group of letters 60, the said letter groups forming a row parallel said first rows 20, 22, and 24, whereby the letter groups extend horizontally in the way the device is shown by way of illustration in FIGURE 1.

The term "number-bearing means 12" is used herein is very special and in the claims it shall be understood to include a housing portion 100 of the device and also to include a plurality of movable slides 102 which are slidably received in and are movable with respect to the housing portion 100.

As best seen in FIGURE 1, the numbers of the various rows of numbers above described are shown as imprinted on and carried by the housing portion 100.

A plurality of windows 120 are provided extending vertically through an upper portion 124 of the thousing 100, each window being disposed in alignment with and adjacent one of the numbers of the rows above described as first rows and second rows.

A plurality of slides 102 are provided, each of which are disposed in a different one of the windows 120, each slide 102 having a generally horizontally extending lower portion 160 bearing a numeral 170 on its upper side, as best seen in FIGURE 1; and each slide 102 having an upwardly extending tab portion 164 attached to its lower portion 160 and protruding above the upper portion or cover 124 of the housing 100 where it can be readily pulled by the finger so as to move the slide 102 downwardly in algniment with the respective second row 30, 32, 34, etc.

It will be seen that the number 170 disposed on the top of the bottom portion 160 of each slide 102 is identical to the respective number marked adjacent the respective window 120 which latter number forms one of the numbers of said first rows and one of said second rows, respectively.

Figure 2:
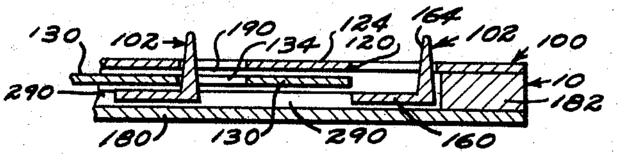
FIGURE 2 is a sectional view taken along the line 2—2 of FIGURE 1.

Referring now to FIGURE 2, it will be seen that the base portion 100 of the number-bearing means 12 has a bottom cover 180 which is spaced from the top cover 124 by fillers 182 attached to the top and bottom covers 124 and 180.

The space 190 between top and bottom covers 124 and 180 is sufficient to slidably receive the lower portions 160 of the slides 102 in positions disposed beneath a slidable clearing plate 130, which latter has a plurality of tab openings 134 therethrough each receiving one of the tabs 102, the clearing plate being slidably received between the side spacing members 210 which are connected to the top and bottom covers 124 and 180 and which are adapted to guide the clearing plate for movements only in parallelism with the direction of movement of the slides 102.

The clearing plate 130 has a projecting portion 131 which projects outwardly from the base portion 100 where it can be gripped by the operator.

In operation, it will be seen that with all tabs disposed in an upper position closest to an end tip 170 of the device and as best seen in FIGURE 1 with the exception of a certain tab 272, that then the device is in a position for the beginning of a recording of a number.

To record a number such as AC–9643, the operator first pulls down the tab 164 which is disposed at the top of the device, the said top being indicated by the end 270 of the base portion 100, and under the letter A. This will cause a large numeral 2 to appear in that window of the first row 20 which is disposed under the letter A. It will be seen that this is effective inasmuch as during a later dialing of a number on the telephone, the dialing of the number 2 has the same effect as the dialing of the letter A.

Next the operator would pull down a slide 102 which is disposed in the second row 22 from the end 270 and under the letter C. This will again cause a large numeral 2 to appear in that respective window.

Next, the operator will move to a third row from the end 270, pulling down a slide 102 which is adjacent a numeral 9. The same sequence is followed for registering the other numbers 6, 4 and 3.

The number is read from the device by the user at a time of later dialing the number or recording the number on some permanent place for storage, if the latter is desired.

After the number is no longer needed, it can be removed from visibility through the windows 120 by sliding the clearing plate 130 toward the end 270. The clearing plate is then drawn down again toward an end 280 in order to establish space provided by the clearing plate openings 134 for permitting the individual pulling down of the tabs 164 when later recording a new number.

Referring to FIGURE 2, it will be seen that the base portion or lower portion 160 of each slide is guided in its motion by guide strips 290 which are disposed between each of the slide bottom portions 160.

The guide strips 290 extend parallel to the second rows 30, 32, etc.

Figure 3:
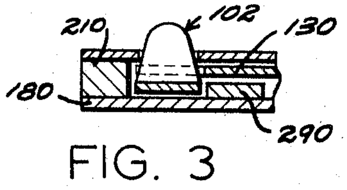
FIGURE 3 is a sectional view as seen along the line 3—3 of FIGURE 1.

The slides 102 are prevented from falling out of the windows 120 by the fact that their lower portions 160 are actually wider than the windows 120, as best seen in FIGURE 1, and further as seen in FIGURE 3.

From the foregoing description, it is thought to be obvious that a mechanism for recording telephone numbers constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A number indicating device comprising: a number-bearing means having thereon a plurality of first substantially straight rows of numbers extending in parallelism alongside each other, the numbers in each of said first rows being in sequence with each other, second substantially straight rows of numerals each extending at a right angle to a respective one of said first rows, each number of said first rows also each forming one of the numbers of one of said second rows, the numbers in each one of said second rows being identical to other numbers in the respective second row, said number-bearing means having spaced apart top and bottom portions, said rows of numbers being visible when looking at said device from its top portion side thereof, said top portion having a plurality of window openings extending therethrough, said window openings being disposed in first and second rows similar to the said first and second rows of said numbers, said window openings each being disposed adjacent and associated with one of said numbers of said first and second rows, a plurality of slides disposed one in each of said windows, each of said slides having a lower portion disposed beneath said top portion of said base portion of said number-bearing means, each of said sides having a tab portion attached to its lower portion and extending upwardly through the respective window for engagement by an operator's finger, each said bottom portion of each slide having a number-indicating means thereon visible through the respective window at times when said respective slide lower portion is disposed opposite said window, means mounting each said slide in said base portion in a manner for sliding with respect to said base portion from a position in which the lower portion of each slide is disposed beneath said top portion of said base portion to an exposed position in which said bottom portion of said slide is disposed opposite said window and visible therethrough.

2. The combination of claim 1 in which each of said bottom portions of each of said sides is provided with a large numeral thereon which is identical with the numeral of said first and second rows which is adjacent to the respective window of the respective slide.

3. The combination of claim 1 in which a clearing plate is slidably disposed between said lower portions of said slides and the said upper portion of said base portion, said clearing plate having an end projecting from said base portion so that it can be manipulated by a user, said clearing plate being slidable in said base portion linearly in each of two directions in alignment with the directions of movement of said tabs, said clearing plate having openings therethrough each receiving a tab, the positions of the walls of said clearing plate openings being such that when said clearing plate is disposed in an inward position in said base, said tabs are held in a position such that their respective sides have their lower portions not visible through said windows, the openings through said clearing plate also being disposed in positions such that their walls will permit said tabs to be moved downwardly into positions such that their lower portions are visible through said windows at times when said clearing plate is in an outwardmost position at its exposed portion to permit recording of a telephone number on said device.

References Cited

UNITED STATES PATENTS

| | | | |
|---|---|---|---|
| 2,778,642 | 1/1957 | Moore | 116—135 |
| 2,945,312 | 7/1960 | Book | 40—336 X |
| 3,194,893 | 7/1965 | Auel | 179—90.2 |
| 3,201,882 | 8/1965 | Alford | 40—336 X |

EUGENE R. CAPOZIO, *Primary Examiner.*

W. J. CONTRERAS, *Assistant Examiner.*